United States Patent [19]

Carson et al.

[11] Patent Number: 4,575,230
[45] Date of Patent: Mar. 11, 1986

[54] TRANSPARENT CONTOURED SUPPORT PLATE FOR FILM

[75] Inventors: John F. Carson, Henrietta; Kimon Papadopoulos, Penfield, both of N.Y.

[73] Assignee: Eastman Kodak Company, Rochester, N.Y.

[21] Appl. No.: 714,595

[22] Filed: Mar. 21, 1985

[51] Int. Cl.[4] ............................................. G03B 27/62
[52] U.S. Cl. .................................... 355/75; 352/221; 353/95
[58] Field of Search ............... 355/75, 76, 99, 100, 355/122, 123; 352/221, 222, 224; 353/95

[56] References Cited

U.S. PATENT DOCUMENTS

| | | | |
|---|---|---|---|
| 1,973,827 | 9/1934 | Shwartz | 355/75 |
| 2,348,905 | 5/1944 | Hopfield | 49/7 |
| 2,562,708 | 7/1951 | Flekel | 371/31 |
| 2,834,273 | 5/1958 | Bartilotta | 355/123 |
| 3,228,284 | 1/1966 | Kallenberg | 355/63 |
| 3,273,953 | 9/1966 | Davee | 352/222 |
| 3,397,613 | 8/1968 | Kallenberg | 355/75 |
| 3,533,687 | 10/1970 | Herzig | 351/121 |
| 3,607,186 | 9/1971 | Bognar | 65/104 |
| 3,658,416 | 4/1972 | Crayton | 353/95 |
| 3,748,033 | 7/1973 | Harvey | 353/60 |
| 3,891,421 | 6/1975 | Levin | 65/107 |
| 3,907,417 | 9/1975 | Fischer | 353/46 |
| 3,930,824 | 1/1976 | Knowles | 65/37 |
| 4,088,470 | 5/1978 | Bourg et al. | 65/105 |
| 4,105,429 | 8/1978 | Delgado | 65/107 |
| 4,118,121 | 10/1978 | Liermann et al. | 355/75 |
| 4,200,392 | 4/1980 | Svatek | 355/75 X |
| 4,241,993 | 12/1980 | Guillaume | 355/75 |
| 4,440,494 | 4/1984 | Wells | 355/75 X |

Primary Examiner—Richard A. Wintercorn
Attorney, Agent, or Firm—Dennis R. Arndt

[57] ABSTRACT

A transparent contoured support plate for use in a printing gate is disclosed which comprises a transparent glass or plastic plate having a smoothly contoured raised central area. This contoured raised area is intended to support the central area of a flexible photographic material, the edges of which are constrained by a mount having an open aperture.

5 Claims, 10 Drawing Figures

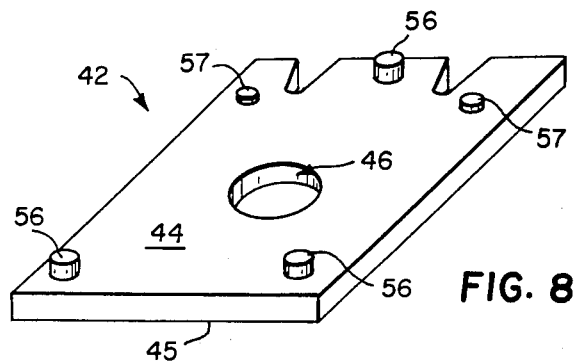
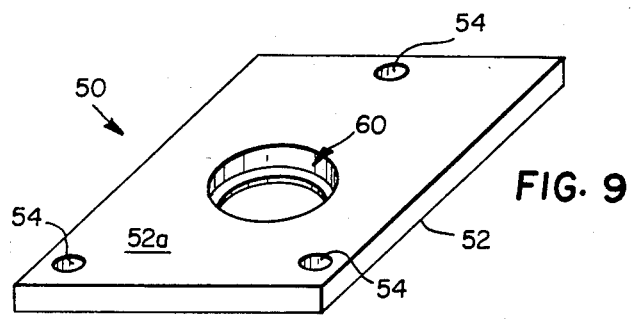
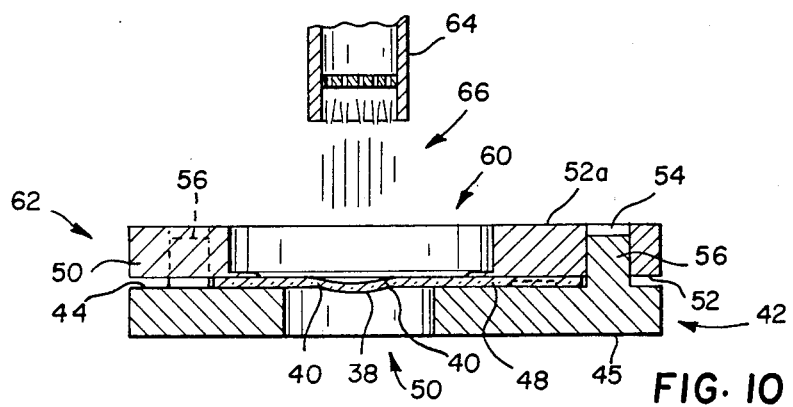

TRANSPARENT CONTOURED SUPPORT PLATE FOR FILM

BACKGROUND OF THE INVENTION

1. Field of the Invention

This invention relates generally to photographic printing apparatus and more particularly, to photographic printing apparatus intended to handle film, either negatives or transparencies wherein the edges of the film are supported in a mount such as a slide frame or aperture-type masking card.

2. Description of the Prior Art

A major problem encountered in the field of photographic printing is the difficulty in maintaining sharp focus of an image mounted in a frame, such as a slide. One cause of loss of focus is due to the tendency of the photographic material to curl, with the concave side of the curl being on the emulsion side of the photographic material.

Various devices have been used in the prior art to solve this problem. One proposed solution is disclosed in U.S. Pat. No. 3,397,613, issued to K. J. Kallenberg. It is a device for supporting a single photographic transparency mounted in a frame and includes a lower transparent holder formed of a base portion having a table portion extending upwardly from the base portion. The table portion has a flat upper surface having an area less than that of the base portion, such that it can fit within the recess formed in the aperture of the slide mount. An upper mount has a similar shape and fits into the recess in the slide mount above the transparency. Thus, the transparency is held between the upper and lower table portions independent of the slide mount.

Several difficulties exist with respect to such prior art devices. Because most commercial photographic printers must be capable of handling multiple film formats, it is necessary that a different transparency holder be provided for each film format that the printer accommodates.

Because of the discontinuities in height presented by the transparency holder, it makes it difficult for both the manual and automatic placement of the mount onto the holder. Any excessive sliding of the mount on the holder in an effort to position the table portion of the plate in the mount aperture would result in the scratching of the film by the upwardly extending table portion.

SUMMARY OF THE INVENTION

According to the invention described herein, a transparent glass or plastic plate having a smoothly contoured, raised central area is used to support the central area of a flexible photographic material, the edges of which are constrained by a mount having an open aperture. This type of a transparent plate is used in the printing gate of a photographic printer intended to print from negatives or transparencies which are held in a mount, such as slides or aperture cards.

The smooth contour of the central raised area allows simplified manual or automatic placement of mounts on the plate because there are no abrupt discontinuities in height that would present an obstacle to the movement of the mount; it is not necessary to position the mount aperture accurately over the plate before it is lowered. In addition, only a small area of the photographic material is contacted which minimizes the risk of scratches.

BRIEF DESCRIPTION OF THE DRAWINGS

Other objects and advantages of the invention will become apparent upon reading the following detailed description and upon reference to the drawings, in which:

FIG. 8 is a perspective view of a holding plate used in the manufacture of the support;

FIG. 9 is a perspective view of a masking plate used in the manufacture of the support; and FIG. 10 is a sectional view showing the masking plate positioned over a carrier plate supporting a piece of the glass, with the assembly positioned under a burner.

DETAILED DESCRIPTION OF THE PREFERRED EMBODIMENT

Figure 1:
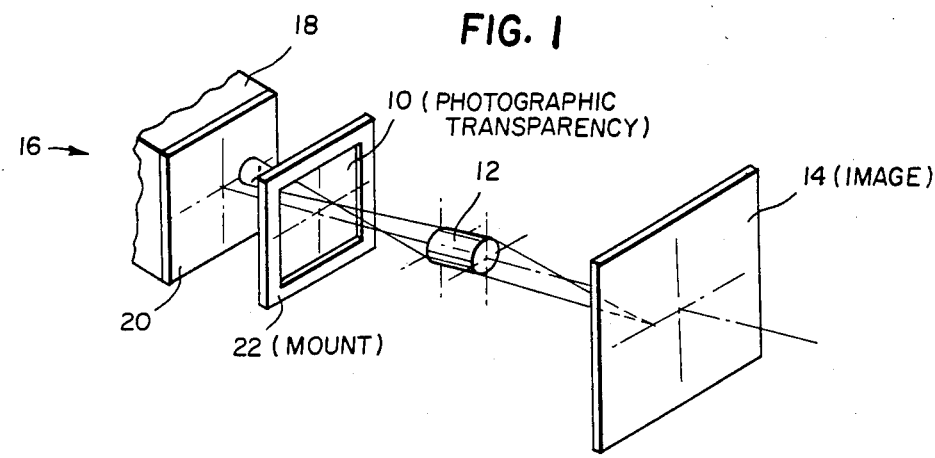
FIG. 1 is a perspective showing the main components of a projection system for a photographic printer.

Referring now to the drawings and in particular to FIG. 1, there is shown the main components of a printer. All printers or enlargers employ the same working principle.

The negative 10 is brightly lighted and its image is focused by a lens 12 onto a sheet of sensitized paper 14. After a sufficient time of exposure, the paper 14 is processed to give an enlarged positive image. The different degrees of enlargement are obtained by adjusting the distance between the lens 12 and the negative and the lens and the paper 14. All printers have certain basic parts in common; an illumination system generally shown at 16 including a lamp (not shown). Some printers employ an integrating bar 18 and means such as a diffuser 20 for scratch suppression. Just beyond the illumination system is a mount 22 of some type for supporting the negative 10; (it should be understood that a positive transparency could also be used instead of a negative whenever the term "negative" is used.) Lens 12 also usually has some provision for focusing. Some form of paper holder (not shown) is required to help maintain the surface of the paper in a single plane. The first five items mentioned above are usually assembled in a single unit, which is moved bodily toward or away from paper 14 to change the scale of enlargement. Lens 12 is focused either independently or automatically to produce a sharp image on paper 14.

The function of negative mount 22 is to hold the negative flat and parallel to the lens plane and perpendicular to the optical path, and at the correct distance from the lens. Negatives 10 may be sandwiched between sheets of glass in a frame, or they may be held by their edges only in cardboard, metal or plastic mounts.

The cardboard mounts have the advantages of offering only two film surfaces for dust to cling to, whereas in the sandwich type there are four glass surfaces in addition to the two film surfaces.

Figure 2:
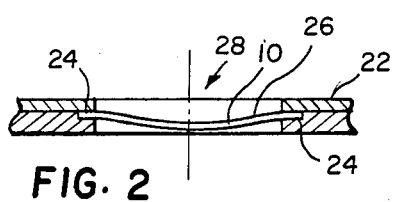
FIG. 2 is a sectional side view of a typical mount for holding a photographic transparency.

Film negatives 10 even with the edges 24 held in a mount 22 have a tendency to buckle as a result of the heat from the projection lamp and portions of the image may go out of focus. Even without the application of heat, there is a tendency for photographic material to curl, as illustrated in FIG. 2, the concave side of the curl being on the emulsion side 26 of the photographic material. Normally, the opening on aperture 28 in the mount 22 is the exact size of a single frame without allowance for the clear margin. This insures that no unnecessary light passes through the negative 10 to form a positive source of stray reflections that might fog the enlarged image projected on sensitized paper 14.

Figure 3:
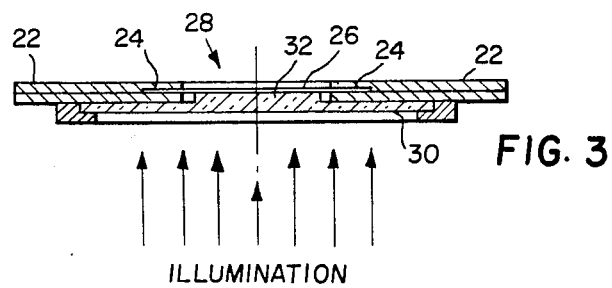
FIG. 3 is a cross sectional view of a printing gate used for projection printing of 135 format mounted transparencies.

A delineated glass support plate 30 having a raised table portion 32 as illustrated in FIG. 3 was used in one attempt to reduce the effects of film curl and maintain proper depth-of-focus. The raised table portion 32 of the support plate 30 was slightly smaller than the opening of aperture 28, allowing table portion 32 to project into mount aperture 32. The height of table portion 32 is approximately one-half the thickness of mount 22, thereby allowing mount 22 to rest on the surface of the glass support plate 30. The raised table portion 32 of support plate 30 is entirely within aperture 28 of mount 22, providing support for negative 10 from below. Thus, negative 10 is properly positioned within the depth-of-focus of projection lens 12. A transparent element like support plate 30 would not introduce any nonuniformities in the apparent radiance of the negative that might be caused by scattering or refraction, because raised table portion 32 contacts negative 10 over substantially the entire surface within aperture 28.

Figure 4:
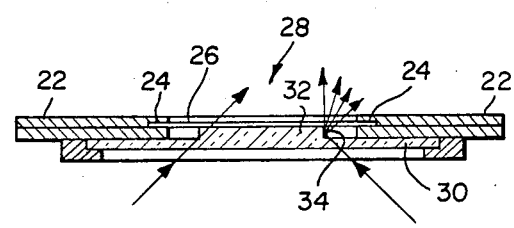
FIG. 4 is a sectional side view of the same type of support shown in FIG. 3 but used with a mount having a larger aperture.

The use of a delineated support plate 30 of the type described above can generally be used only with one size of mount aperture. If the size of the raised table portion 32 is noticeably smaller than aperture 28 of mount 22, edges 34 of the table portion may become visible in the image of the negative as illustrated in FIG. 4. This generally will be regarded as a nonuniformity in the radiance provided by the illumination system, and such nonuniformities or variations are usually objectionable. Thus, it can be seen that any transparent element, such as glass or plastic support plates introduced between the illumination system and the negative, should not introduce noticeable nonuniformities in radiance.

Use of a delineated glass support plate 30 of the type described above would require a different support for each format used to insure that the raised table portion 32 of the support matches and fills aperture 28 of mount 22. A delineated glass support 30 having a raised table portion 32 of lesser area than the aperture 28 of mount 22 as illustrated in FIG. 4 would result in nonuniformities caused by the scattering or refraction of light by the steep edges 34 of raised table portion 34.

Figure 5:
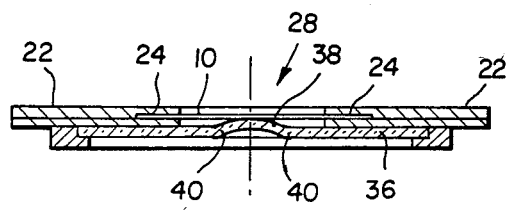
FIG. 5 is a sectional view of a printing gate using the support of the present invention and a typical mount supported thereby.

In accordance with the present invention, FIG. 5 illustrates the use of a transparent contoured glass or plastic support plate 36 having a smoothly contoured raised central area 38 used to support the central region of a flexible photographic negative 10, the edges 24 of which are constrained by a mount having an open aperture 28.

Because of the gentle slope of sides 40 of the raised central area 38, there is very little refraction of light by plate 36, and virtually no nonuniformities in radiance result from the use of such a support plate. If rays were to be traced from the entrance pupil of the projection lens 12 through to a point on the negative 10, they would be refracted only slightly by plate 36 and strike illumination system 16 diffuser 20 at approximately the same location and angle as when a plate having no contour was used.

In one sample, the contoured glass plate 36 was made 0.060 inch thick. The contour on the convex side and the contour on the concave side was approximately modeled by a rotationally symmetric gaussian function having the following form:

$$X = he - \frac{Y^2 + Z^2}{2 S^2}$$

where
h is the height of the contour above, the surface of the glass having a typical value of h=0.009 inch;
S is the lateral measurement of the contour having a typical value of S=0.220 inch;
X, Y and Z are unit measures along their respective axes.

Figure 6:
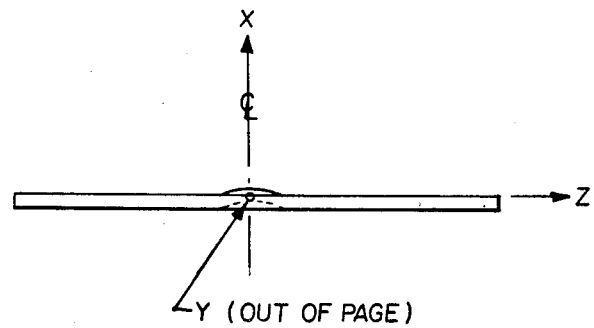
FIG. 6 is a sectional side view of the support of the present invention along with a three axis coordinate system.

The coordinate system used with respect to the glass plate is shown in FIG. 6.

The optical system described herein is intended to project images of photographic materials in mounts having apertures that range from 0.910 inch × 1.286 inch to 2.579 inch × 2.062 inch. These aperture sizes are intended as examples only and are not meant to establish limits for the disclosed contoured support plate. The half-thickness of the mount is 0.009 inch. When the mount having the smallest aperture is used, the maximum magnification is 12.86 with the depth-of-focus being 0.006 inch.

Figure 7:
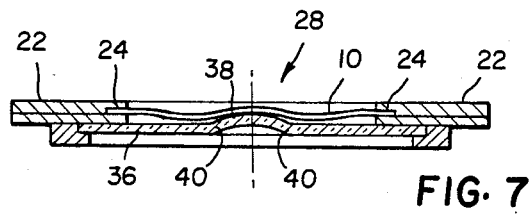
FIG. 7 is a sectional side view of the support of the present invention used with a mount having a larger aperture.

It should be noted that the mount having the largest aperture has a minimum optical magnification of 3.97 and a depth-of-focus of 0.025 inch. FIG. 7 illustrates the use of a mount 22 having a maximum aperture 28 and with such a large format, the negative may exhibit considerable buckling and curling. However, this will not present a problem when the larger image sizes are used because the lower magnification results in more than adequate depth-of-focus.

The smooth contoured glass support plate 36 can be used with a wide variety of formats and does not require the insertion of a new support plate with every format change. In addition, the smooth contoured central area 38 allows the mounts to be positioned in the gate with minimum interference and alignment problems. This was not the case when a delineated support plate 30 having a table portion 32 was used. The abrupt edges of table portion 32 would offer interference with mount 22, as well as require proper alignment of table portion 32 with aperture 28 of mount 22.

Use of the smooth contoured support plate 36 allows only a small area of the photographic negative 10 to come in contact with the plate, thereby minimizing the risk of scratches and other contact damage to the photographic negative 10, certainly far better than the substantially full surface contact of the photographic negative 10 with the surface of the raised table portion 32 of the delineated support plate 30.

Because there is no noticeable variation in radiance when the smooth contoured glass support plate 36 is used, the entire area of photographic negative 10 that appears in aperture 28 of mount 22 is available for projection.

Consideration will now be given to the manufacture and fabrication of the smoothly contoured glass support plate 36 of the present invention. FIGS. 8 and 9 illustrate heat resistant plates, used in the fabrication of the contoured central area 38 of glass plate 36. If an attempt is made to heat a relatively small area in a sheet or plate of cold glass to softening temperature with a torch or blow pipe in the ordinary manner, the stress created in the glass could cause it to crack before softening. This chiefly occurs because the cold outer portion of the glass sheet or plate surrounding the central heated area is put under tensioned stress, while the heated glass at the center is under compressional stress. Therefore, with glass being relatively weak under tension, cracking readily occurs.

Thus, it can be seen that the working characteristics of the glass require that precautions be taken to avoid thermally shocking the glass. One way to reduce thermal shock is to use a carrier plate 42 for the glass, the design details of which are illustrated in FIG. 8. The carrier plate 42 is made of electroless-nickel-plated mild steel, machined flat on both upper and lower surfaces 44 and 45 respectively. The carrier plate has five locating pins which project above the upper surface 44 of the plate 42. Three of the pins 56 are approximately one-quarter inch high while the remaining two pins 57 have a height slightly less than the thickness of the glass 36, which is approximately 0.060 inch. All five pins serve to correctly align the glass plate with respect to a hole 46, which would have a diameter of approximately one inch to fabricate a plate 36 of the dimension mentioned above. The position of the hole 46 is concentric with the location in which the contour is to be formed in the glass plate 48.

Carrier plate 42 described above is intended to be used in conjunction with masking plate 50 illustrated in FIG. 9. This plate is also made of electroless-nickel-plated mild steel, machined flat on its lower surface 52. The masking plate has three locating holes 54 which fit with slight clearance, over the three locating pins 56 of the carrier plate 42. When a glass plate 48 is positioned on the carrier plate 42, the lower surface 52 of masking plate 50 will rest on the upper surface 58 of glass plate 48 and be aligned by locating pins 56 of carrier plate 42. A one and one-quarter inch hole 60 in masking plate 50 is concentric with hole 60 in carrier plate 42 when properly positioned on locating pins 56 over carrier plate 42. For all but the lowest 1/16" of the thickness of the plate, this hole is machined out to $1\frac{3}{4}"$ in diameter. These dimensions are exemplary of those considered suitable for making a glass plate 36 of the dimension mentioned above.

During the manufacturing process, a stack of carrier plates 42, each with a piece of glass 48 positioned thereon is placed in a preheat furnace adjusted to a temperature of approximately 500° C. which is just above the strain point of glass 48. Masking plate 50 is placed on the uppermost carrier plate 42 such that the lower surface 52 of masking plate 50 rests on locating pins 56 of carrier plate 42 so that the lower surface 52 of masking plate 50 does not contact the surface of glass 48.

After the furnace temperature and its contents have been fully stabilized, the three locating holes 54 in masking plate 50 may be aligned with locating pins 56 of carrier plate 42, thereby allowing lower surface 52 of masking plate 50 to contact the upper surface of glass plate 48. With masking plate 50 in place over carrier plate 42, glass plate 48 is effectively sandwiched between heat resistant plates 42 and 50 forming an aggregate assembly 62, as shown in FIG. 10. The assembly is then transferred to a positioning fixture (not shown) which insures the correct alignment of the holes 46 and 60 in plates 42 and 50 with an air natural gas burner 64 which is moved to within a predetermined distance from glass plate 48 at the point where the glass is to be sagged. It was found that without the larger opening in the upper portion 52a of masking plate 50, the burner flame 66 would sometimes extinguish itself during the sagging operation. The sole function of the masking plate 50 is to prevent overheating of the outer areas of the glass surface by the flame, which would cause the glass plate 48 to warp upon cooling. A short time after heat is applied to the glass, the glass will sag by a predetermined controlled amount. The central portion of the upper surface 58 of glass plate 48 is then concave and convex on the carrier plate 42 having a predetermined desired radius of curvature. Burner 64 is removed and the glass allowed to harden again. The resulting optical surface is very smooth and free of any sharp delineations. Assembly 62 is then transferred to an annealing furnace (not shown), which is also held at about 500° C. Masking plate 50 is removed and transferred to the next carrier plate 42 on the stack in the preheat furnace. The procedure is then repeated until contoured surfaces 38 have been formed on each glass plate 48 and all glass plates 48 have been placed in the annealing furnace. The annealing furnace is then turned off and allowed to cool at its natural rate, thereby providing a coarse anneal to plates 48.

As a final step in the manufacturing process, an anti-Newton ring surface is produced by lightly etching the glass with a solution of HF, $H_2SO_4$ and water. Before etching, both glass surfaces must be buffed with a fine abrasive such as jeweler's rouge. Otherwise, a differential etching would occur between areas of the glass surface exposed to the flame and those areas not exposed. This would lead to a streaky appearance.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A transparent support for supporting a resilient image-bearing medium in a projector plane of a projection apparatus having means for projecting an image from the image-bearing medium, the edges of which are constrained in a mounting member having an open aperture, said support comprising:
    a substantially flat plate for engaging and supporting the mounting member, said plate having a smoothly contoured raised central area for engaging and supporting the central area of the resilient image-bearing medium.

2. The invention defined in claim 1 wherein the mounting member has a thickness greater than that of the image bearing medium and at least a portion of said thickness extending below the edge plane of the image bearing member; and said raised central area has a height equal to approximately the thickness of said thickness portion.

3. The invention defined in claim 1 wherein said transparent support plate is made of glass.

4. The invention defined in claim 1 wherein said transparent support plate is made of plastic.

5. The invention defined in claim 2 wherein said smoothly contoured raised central area is approximated by:

$$X = he - \frac{Y^2 + Z^2}{2 S^2}$$

where
h is the height of the contour above the surface of the glass;
S is the lateral measurement of the contour; and
X, Y and Z being values of unit measure along their respective axes.

* * * * *